United States Patent
Singh et al.

(10) Patent No.: US 7,542,592 B2
(45) Date of Patent: Jun. 2, 2009

(54) SYSTEMS AND METHODS FOR FACE DETECTION AND RECOGNITION USING INFRARED IMAGING

(75) Inventors: Maneesh Singh, Plainsboro, NJ (US); Kazunori Okada, Plainsboro, NJ (US); Benedicte Bascle, Lannion (FR); Dorin Comaniciu, Princeton Jct., NJ (US); Gregory Baratoff, Regensburg (DE); Thorsten Köhler, Deuerling (DE)

(73) Assignees: Siemesn Corporate Research, Inc., Princeton, NJ (US); Siemens Aktiengesellschaft, München (DE)

( * ) Notice: Subject to any disclaimer, the term of this patent is extended or adjusted under 35 U.S.C. 154(b) by 815 days.

(21) Appl. No.: 11/091,142

(22) Filed: Mar. 28, 2005

(65) Prior Publication Data

US 2005/0226471 A1 Oct. 13, 2005

Related U.S. Application Data

(60) Provisional application No. 60/557,354, filed on Mar. 29, 2004.

(51) Int. Cl.
G06K 9/00 (2006.01)
(52) U.S. Cl. .................. 382/118; 348/36; 348/169; 382/103; 382/284
(58) Field of Classification Search .............. 348/36, 348/169; 382/103, 104, 115, 118, 164, 284
See application file for complete search history.

(56) References Cited

U.S. PATENT DOCUMENTS

| 5,835,616 | A * | 11/1998 | Lobo et al. | 382/118 |
|---|---|---|---|---|
| 6,671,391 | B1 | 12/2003 | Zhang et al. | |
| 7,027,619 | B2 * | 4/2006 | Pavlidis et al. | 382/115 |
| 7,030,775 | B2 * | 4/2006 | Sekiguchi | 340/903 |
| 7,155,037 | B2 * | 12/2006 | Nagai et al. | 382/118 |
| 7,324,670 | B2 * | 1/2008 | Kozakaya et al. | 382/118 |
| 7,324,671 | B2 * | 1/2008 | Li et al. | 382/118 |
| 7,440,637 | B2 * | 10/2008 | Schechner et al. | 382/284 |
| 2003/0053664 | A1 * | 3/2003 | Pavlidis et al. | 382/117 |
| 2003/0108244 | A1 * | 6/2003 | Li et al. | 382/227 |
| 2003/0123754 | A1 * | 7/2003 | Toyama | 382/291 |
| 2003/0204384 | A1 * | 10/2003 | Owechko et al. | 703/1 |

(Continued)

OTHER PUBLICATIONS

Beymer D J: Face recognition under varying pose Computer Vision and Pattern Recognition, 1994. Proceedings CVPR '94., 1994 IEEE Computer Society Conference on Seattle, WA, USA Jun. 21-23, 1994, Los Alamitos, CA, USA,IEEE Comput. Soc, Jun. 21, 1994, pp. 756-761, XP010099341 ISBN: 0-8186-5825-8 section 4.2 Recognition Algorithm abstract.

(Continued)

*Primary Examiner*—Gregory M Desire
(74) *Attorney, Agent, or Firm*—Donald B. Paschburg; F. Chau & Associates, LLC

(57) ABSTRACT

Methods for image processing for detecting and recognizing an image object include detecting an image object using pose-specific object detectors, and performing fusion of the outputs from the pose-specific object detectors. The image object is recognized using pose-specific object recognizers that use outputs from the pose-specific object detectors and the fused output of the pose-specific object detectors; and by performing fusion of the outputs of the pose-specific object recognizers to recognize the image object.

21 Claims, 8 Drawing Sheets

U.S. PATENT DOCUMENTS

| | | | | |
|---|---|---|---|---|
| 2004/0105573 | A1* | 6/2004 | Neumann et al. | 382/103 |
| 2005/0226471 | A1* | 10/2005 | Singh et al. | 382/118 |
| 2006/0028552 | A1* | 2/2006 | Aggarwal et al. | 348/169 |
| 2006/0187305 | A1* | 8/2006 | Trivedi et al. | 348/169 |
| 2007/0160296 | A1* | 7/2007 | Lee et al. | 382/224 |

OTHER PUBLICATIONS

Zhihong Pan et al: "Face Recognition in Hyperspectral Images" IEEE Transactions on Pattern Analysis and Machine Intelligence, IEEE Inc. New York, US, vol. 25, No. 12, Dec. 2003, pp. 1552-1560, XP001186942 ISSN: 0162-8828 cited in the application abstract.

Binglong Xie et al: "Component Fusion for Face Detection in the Presence of Heteroscedastic Noi se" Proceedings Annual Conference of the German Society for Pattern Recognition DAGM, Sep. 10, 2003, pp. 434-441, XP002316745 section 2 Component Detectors abstract.

Heisele B et al: "Component-based face detection" Proceedings 2001 IEEE Conference on Computer Vision and Pattern Recognition. CVPR 2001. Kauai, Hawaii, Dec. 8-14, 2001, Proceedings of the IEEE Computer Conference on Computer Vision and Pattern Recognition, Los Alamitos, CA, IEEE Comp. Soc, US, vol. 1 of 2, Dec. 8, 2001, pp. 1657-1662, XP002316744 ISBN: 0-7695-1272-0 abstract.

Moghaddam B et al: Face Recognition Proceedings of the SPIE, SPIE, Bellinoham, VA, US, vol. 2277, Jul. 28, 1994, pp. 12-21, XP000579416 ISSN: 0277-786X section 3 Estimation of Head Orientation abstract.

Pentland A et al: View-Based and Modular Proceedings IEEE Computer Society Conference OM Computer Vision and Pattern Recognition, 1994, pp. 1-7, XP000197979 section 4.2 View-invariant detection abstract.

Bileschi S M et al: "advances in Component-based Face Detection" Lecture Notes in Computer Science, Springer Verlag, New York, NY, US, vol. 2388, 2002, pp. 135-143, XP002297851 ISSN: 0302-9743 abstract.

* cited by examiner

SYSTEMS AND METHODS FOR FACE DETECTION AND RECOGNITION USING INFRARED IMAGING

CROSS-REFERENCE TO RELATED APPLICATION

This application claims priority to U.S. Provisional Application No. 60/557,354 filed on Mar. 29, 2004 which is fully incorporated herein by reference.

TECHNICAL FIELD

The present invention relates to image processing in general and more particularly, to systems and methods for detecting and recognizing faces using infrared imaging and processing.

DISCUSSION OF THE RELATED ART

Face detection and recognition is potentially a very useful tool in applications such as surveillance and access control. The goal is to identify a face from an input image or a video stream and to register it with a face database. Such a task is challenging due to various reasons. First, authentication requires extremely low false alarm rates and high detection probability simultaneously. Second, these applications need to use high quality cameras and complex algorithms that require significantly large amount of computational resources. Third, face images cannot always be captured in controlled imaging conditions with constraints specified on face orientation/position, lighting condition and background clutter. Real-time, uncontrolled, outdoor conditions in which the above applications are expected to perform imply challenges in the form of highlights and glare due to the sun, day/night variations, night lights, weather conditions, head movement, complex background, moving background, etc. Image variations due to these factors make the face detection and recognition task more difficult.

SUMMARY

Face detection using components offers superior results due to its robustness to occlusions, pose and illumination changes. A first level of processing is devoted to the detection of individual components, while a second level deals with the fusion of the detected components. However, the known fusion methods neglect the uncertainties that characterize the component locations. These uncertainties carry useful information that could lead to increased face localization accuracy.

Infrared light has a much longer wavelength than visible light. The longer wavelength of infrared light allows it to penetrate objects that visible light cannot. Using infrared light to illuminate faces would allow for better component based face recognition as it implies robustness to variations in the image due to ambient lighting and surface texture.

Exemplary embodiments of the present invention relate to image processing, specifically to detecting and recognizing faces using infrared imaging and processing. According to one exemplary embodiment, a method for image processing for detecting and recognizing an image object include detecting an image object using pose-specific object detectors, and fusing the outputs from the pose-specific object detectors. The image object is recognized using pose-specific object recognizers that use outputs from the pose-specific object detectors and the fused output of the pose-specific object detectors; and by fusing the outputs of the pose-specific object recognizers to recognize the image object.

In an another embodiment, a method for detecting and recognizing a face in an image includes detecting one or more faces in the image using pose-specific detectors, wherein the face poses are sourced from an infrared image of the face and fusing the outputs from the pose-specific detectors. The face is then recognized using pose-specific recognizers that use outputs from the pose-specific detectors and the fused output of the pose-specific detectors, and by fusing the outputs of the pose-specific recognizers. The face is recognized from an image database of multiple faces using the fused output of the pose-specific recognizers.

BRIEF DESCRIPTION OF DRAWINGS

Exemplary embodiments of the present invention are described with reference to the accompanying drawings, of which.

DETAILED DESCRIPTION OF EXEMPLARY EMBODIMENTS

Figure 1:
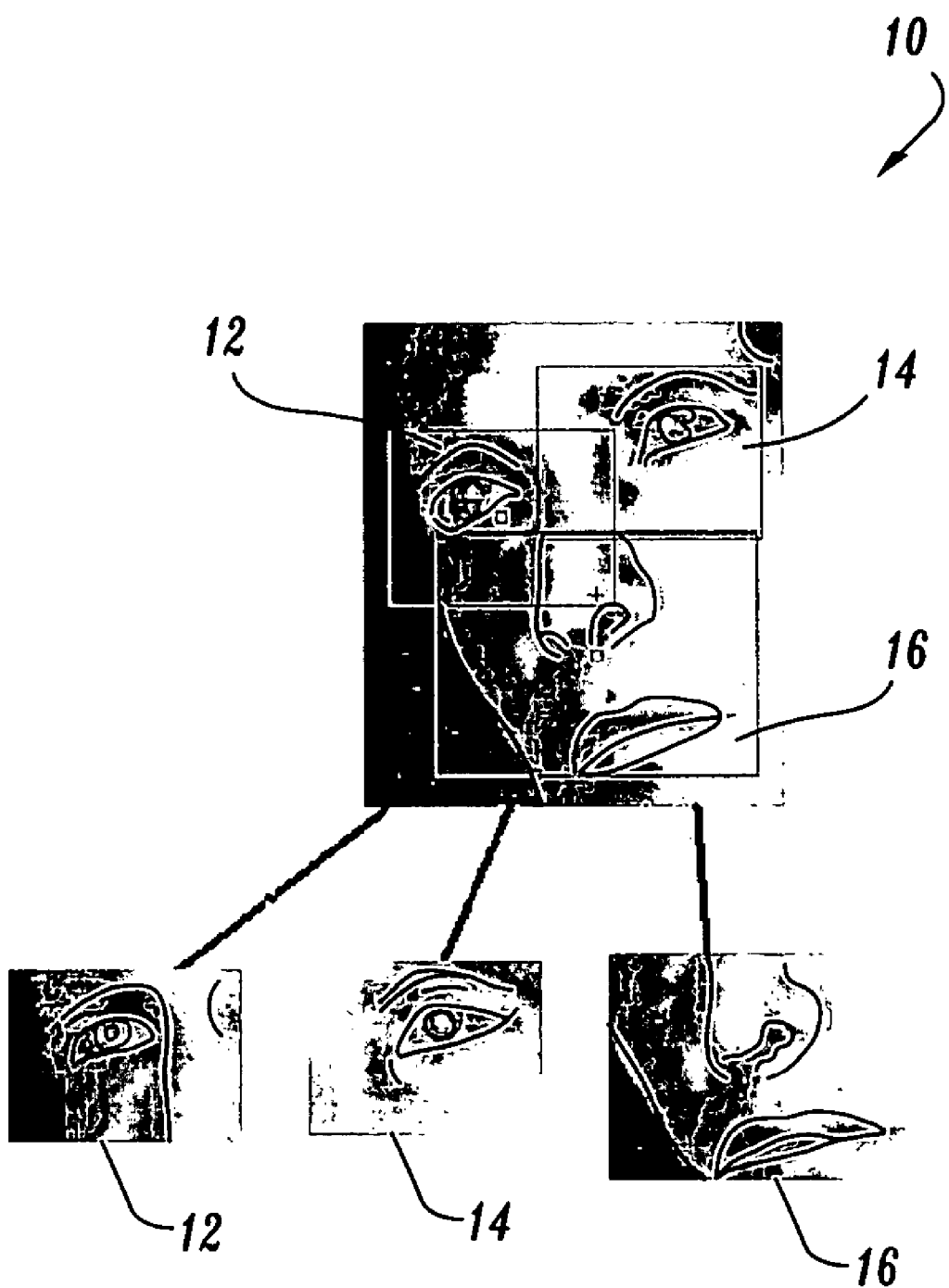
FIG. 1 shows a component based analysis of an exemplary human face according to an exemplary embodiment of the invention.

FIG. 1 shows a component based analysis of an exemplary human face in an exemplary embodiment of the invention. To detect and recognize objects in an image, the image is analyzed into components by component detectors and then recognizers are used to recognize the image object. For the purpose of illustration an image of a human face with left-eye, right-eye and lower-face components below is considered below. The exemplary object to be detected in the illustrative image is a human face. Those skilled in the art will appreciate that any image can be processed to detect and recognize given image objects present in the image being analyzed.

Human faces are imaged using an infrared camera (not shown). Exemplary face image 10 is obtained using an infrared camera together with Near Infrared (NIR) lighting provided by LEDs (Light Emitting Diodes) as an active light source. Those skilled in the art will appreciate that any suitable camera can be used as an infrared camera.

Component fusion is based on the modeling of uncertainties. Using components gives the system better performance when pose and illumination variations and occlusions occur. This is because, while pose and illumination significantly change the global face appearance, components, which are smaller than the whole face, are less prone to these changes.

Components are used for the left eye, right eye and mouth to form a left eye region 12, a right eye region 14 and a mouth region 16. To achieve real-time run-time performance, AdaBoosting is used when training component detectors. The component detectors can accurately detect and locate the face components. This information is used to register and normalize the face to a "standard" one, which is appropriate for face recognition. Fusion relies on modeling the noise as heteroscedastic and is constrained by a geometric face model.

Figure 2:
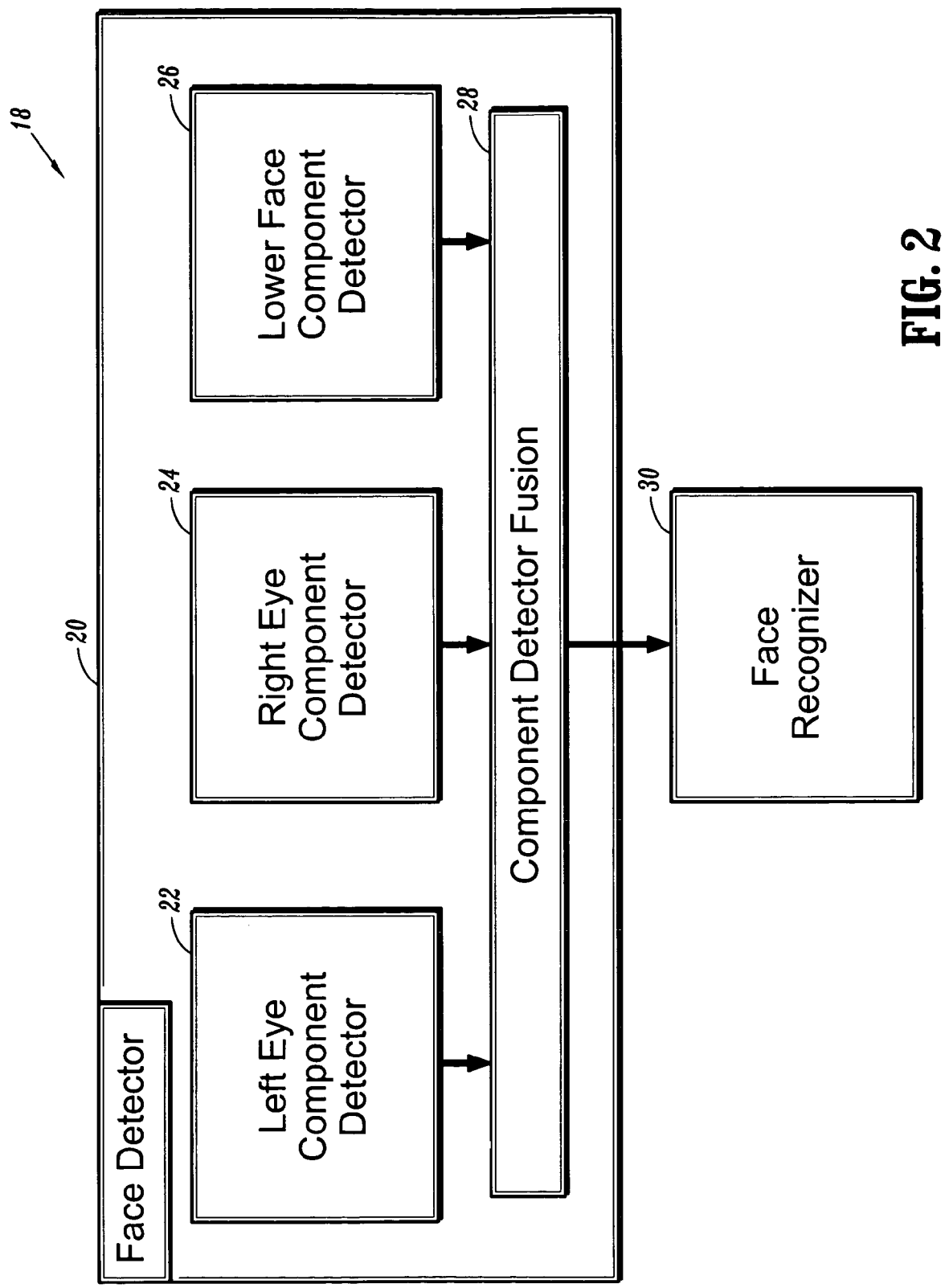
FIG. 2 shows a single pose detection and recognition system according to an exemplary embodiment of the present invention.

FIG. 2 shows a single pose detection and recognition system according to an exemplary embodiment of the present invention. A face detection and tracking system 18 includes a face detector 20. The face detector 20 includes a left eye component detector 22, a right eye component detector 24 and a lower face component detector 26. Separately recognizing components of the face in a face image provides for an enhanced performance in the process of detecting and recognizing faces. A component fusion module 28 receives the separately processed components from the multiple detectors 22-26 and then fuses the detected parts together to perform face recognition. The process of face recognition is performed by a face recognizer 30.

Capturing of images in which components are detected is described next. A regular camera can be modified to function as an infrared camera. Most known digital cameras use a CCD (Charged Couple Device) camera which is sensitive to both visible and infrared light. An Infrared Cut Filter (ICF) is usually installed between the CCD and the lens. The ICF needs to be removed to allow infrared and visible light to be captured through the lens. Further, an Infrared Filter (IF) can be installed that blocks all light except the Infrared light. For example, a near infrared filter at approximately 850 nanometer wavelength can be used. Instead of a CCD camera, a CMOS camera can be used which is sensitive in the near infrared spectrum. An infrared cut filter can be placed in front of the lens to block the visible light and to let pass the infrared light.

Most indoor and fluorescent lighting do not emit significantly in the infrared range, and hence unsuitable to be used with an infrared camera. Sunlight contains infrared, but dependence on ambient sunlight drastically reduces the range of feasible operating conditions. To capture images robust to variations in the external illumination conditions, a panel of infrared LEDs is used to illuminate faces. This ensures a good image contrast irrespective of the outside lighting conditions. In particular, with active infrared lighting, good quality pictures with high signal-to-noise ratio can be obtained under poor or no lighting (e.g., at night or in bad weather) conditions, and even when faces are brightly backlit (bright sun). Infrared LEDS are used in the same wavelength range as the camera IR filter (850 nm). Infrared illuminators are used because they are known to have long bulb-life and low running costs.

Infrared light has a much longer wavelength than visible light, and this longer wavelength allows it to penetrate objects that the visible light cannot. In particular infrared light penetrates deeper into skin than visible light and is not much dependent on surface reflectivity. This implies that infrared images are robust to variations in the surface texture and may have more information about surface geometry. It is known that in some instances, near IR might contain better information about identity than visible light.

It is known that spectral measurements over the near-infrared allow the sensing of subsurface tissue structure which is significantly different from person to person, but relatively stable over time. The local spectral properties of human tissue are nearly invariant to face orientation and expression, which allows hyperspectral discriminants to be used for recognition over a large range of poses and expressions. Face recognition algorithms that exploit spectral measurements for multiple facial tissue types and show interesting experimental results are known. Hence, face identity might be more easily determined in near IR than in visible light. Some of the aspects of face recognition using infrared images are discussed in Z. Pan, G. Healy, M. Prasad, B. Tromberg, "*Face Recognition in Hyperspectral Images*", IEEE Trans. On Pattern Analysis and Machine Intelligence (PAMI), vol. 25, issue 12, pages 1552-1560, December 2003, which is incorporated by reference.

The detection and recognition process is extended to create an array of object detectors and recognizers to respectively detect and recognize several poses from an object class. Probabilistic fusion of the above array of detectors and recognizers is done to create more powerful detectors and recognizers that can detect and recognize the whole object class, irrespective of the specific pose presented.

The geometric face model is trained from known face examples. From the location of the components in each training face example, the means and covariance matrices of the components are estimated. This gives the probabilistic geometric face model. Uncertainties are also estimated for each component observation.

The goal of probabilistic component fusion is to estimate the face location having the maximum likelihood given the image measurements and the geometric face model. An approximate solution can be obtained by performing two biased minimizations and taking the weighted average of the two. The first minimization minimizes the Mahalanobis distance in model space, and the second the Mahalanobis distance in observation space.

Once face detection and face component registration is performed, the face image can be rectified based on components' positions, so as to compensate for head pose. Once such a rectified and segmented face image is obtained, recognition is performed using either full-face recognition or component-based recognition.

Figure 3:
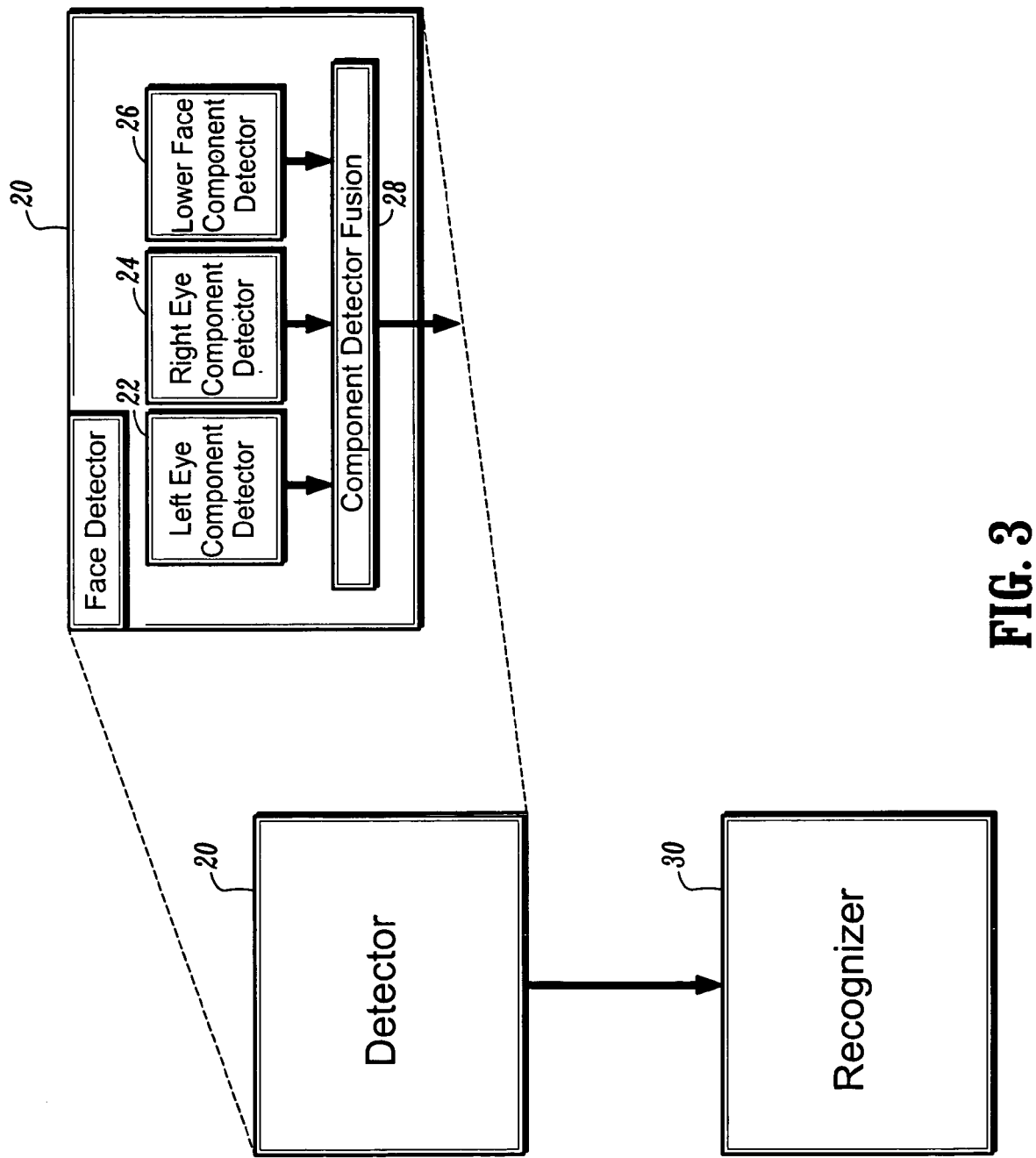
FIG. 3 shows a single pose detection and recognition system in an exemplary embodiment of the invention.

FIG. 3 shows a single pose detection and recognition system in an exemplary embodiment of the invention. This detector operates to detect one given pose of the person's face using separate detectors for each facial component. To detect a single pose of a person's face, the face detector 20 and the face recognizer 30 can be used. The face detector 20 includes the above described components, i.e., the left eye component detector 22, the right eye component detector 24, the lower face component detector 26 and the face recognizer 30.

Figure 4:
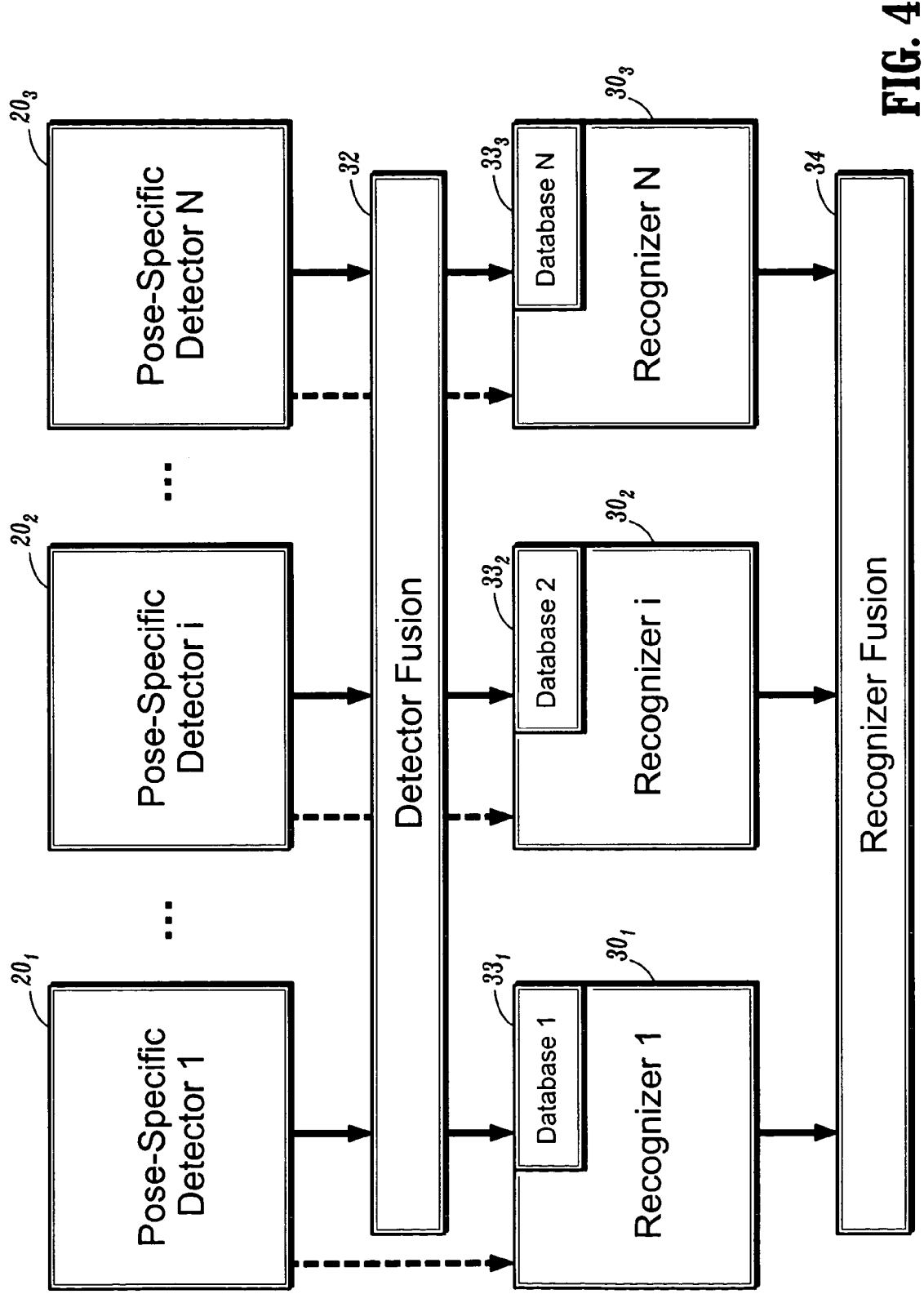
FIG. 4 shows a multi-pose detection and recognition system according to an exemplary embodiment of the invention.

FIG. 4 shows a detection and recognition system in an exemplary embodiment of the invention. A series of exemplary pose-specific detectors 201-203 are shown. The system consists of an array of face detectors and recognizers that are tuned to detect and recognize specific poses of an image object. Each pose-specific detector is trained beforehand on a pose-specific database. Each recognizer has a pose-specific recognition database of faces using which faces in the input image, once detected, are recognized and labeled. A pose-specific object detector is an object detector whose detection performance is sensitive to object poses with the peak performance tuned to a range of poses around a certain object pose.

This array of face detectors can contain an arbitrary 'N' number of detectors. Each face detector includes face detector components described above such as the left eye component detector 22, the right eye component detector 24, and the lower face component detector 26.

A multi-detector fusion module 32 is used to collect and process together the results of 'N' detectors, which in the present example are face detectors $20_1$-$20_3$. The output of the multi-detector fusion module 32 is supplied to a series of 'N' pose-specific face recognizers, which in the present example are pose-specific recognizers 30$_1$-30$_3$. Each one of the pose-specific face recognizers 30$_1$-30$_3$ also receives an input from the corresponding detectors 20$_1$-20$_3$ and has access to a corresponding object database (33$_1$-33$_3$). Outputs from the pose-specific recognizers 301-303 are fused together by a recognizer fusion module 34. A pose-specific object recognizer is an object recognizer whose recognition performance is sensitive to object poses with the peak performance tuned to a range of poses around a certain object pose. The detection process is discussed below in the context of FIGS. 6 and 7.

The recognizers 30$_1$-30$_3$ perform image recognition as described next. For faces, the pose includes a specific pose of the face, e.g., front-view pose or side-view pose. Even with rectification, face recognition performance is severely limited by the variation in the pose of the test face with respect to the registered face database. A larger database can be created to cover the whole pose space. However, the class-data may not be sufficiently clustered to use relatively simple sub-space projection methods, e.g., methods such as Linear Fisher Discriminant, for recognition. Methods that model each class as manifold are not suitable for a real-time application. The recognition process described below builds up several pose-specific classes and trains an array of dedicated pose-specific classifiers. The output of these classifiers is then fused robustly to give a face recognizer that can process a wider range of facial poses. Each pose-specific face classifier is trained with examples for that pose.

A label space, S, is identified such that S={1, 2, . . . , k, . . . K}, where K is the number of people in the database. In an illustration, it is assumed that there are N pose-specific recognizers that correspond to pose-specific detectors. Given an input face that is processed by the detectors, each recognizer generates a distribution of confidence (i.e., how confident that the input corresponds to a person k) over the identity space as given below:

$\hat{P}_i(k)$, where i∈1, . . . , N and k∈1, . . . , K

A set of weights $\omega_i = c_i^{(t)}$ are assumed to be provided from the detector set, indicating how reliable the result from each pose-specific detector component should be. Then, the following linear fusion is formulated in order to integrate the characterizations of the input in the label space according to the set of pose-specific recognizers, $$\hat{P}(k) = \sum_{i=1}^{N} \omega_i \hat{P}_i(k),$$

And $$k^* = \arg\max_k \hat{P}(k)$$

is the best recognized person in the maximum likelihood and nearest neighbor sense in this fusion framework.

The multi-pose face recognition system presented in various embodiments of the present invention can be understood as a specific realization of the above general framework by considering an array of pose-specific face detectors, each tuned to detect faces within non-overlapping (with other detectors) pose ranges. The components so recognized are used to register the face image being processed with a database of face images.

This process of detection and recognition is multiply instantiated to create an array of component detectors and recognizers to detect and recognize several poses or instances from an object class. Probabilistic fusion of the above array of detectors and recognizers is done to create powerful object detectors and recognizers that can detect and recognize the whole object class, irrespective of the specific pose presented.

Figure 5:
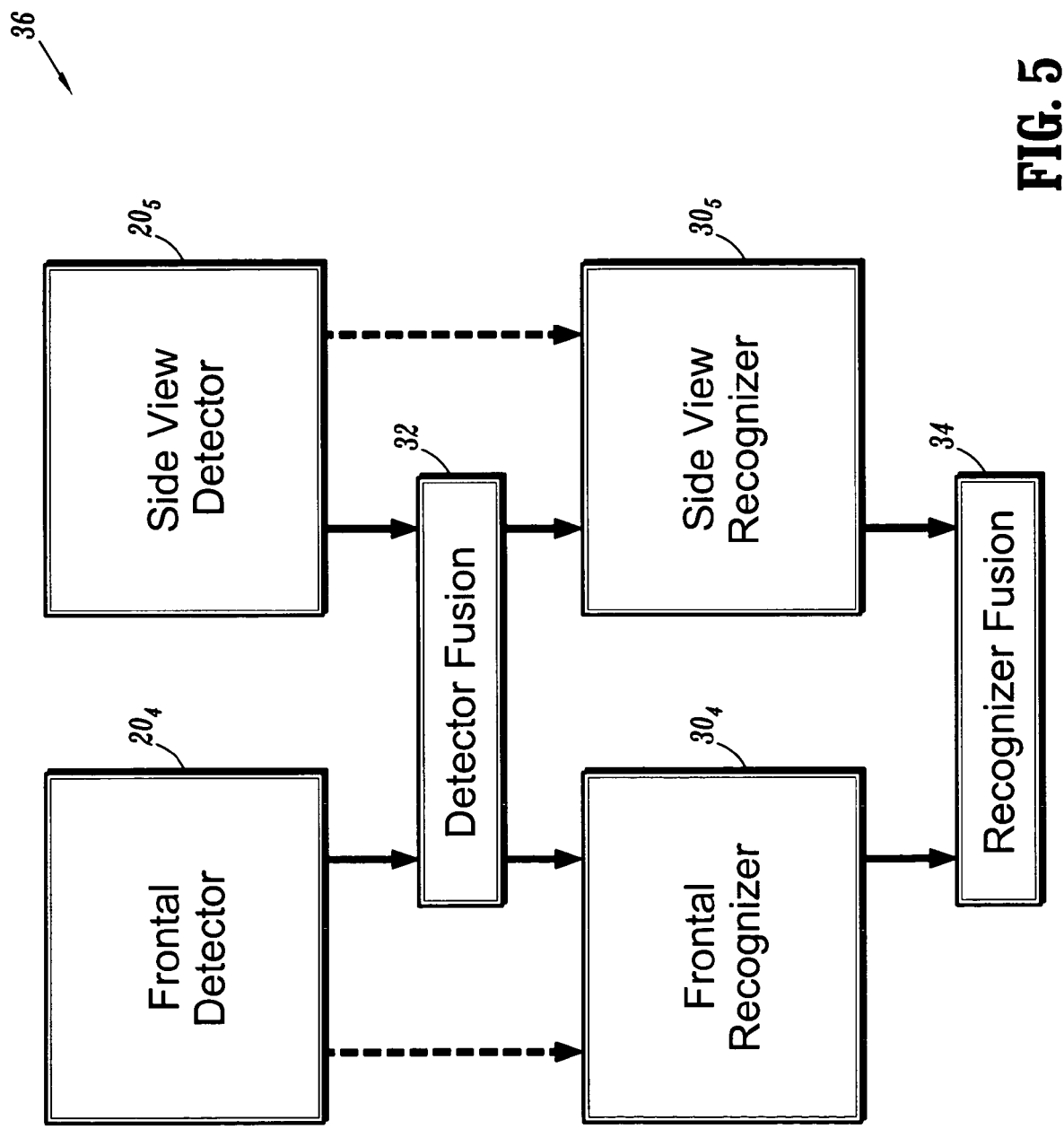
FIG. 5 shows an exemplary multi-pose face detector and recognizer according to an exemplary embodiment of the invention.

FIG. 5 shows an exemplary multi-view face detector and recognizer in an exemplary embodiment of the invention. A multi-view face detection and recognition system 36 includes a frontal detector 20$_4$ and a side view detector 20$_5$ to capture front and side views of the face. A multi-detector fusion module 32 receives and processes the outputs of the frontal detector 20$_4$ and the side vide detector 20$_5$. A frontal recognizer 30$_4$ receives and process the outputs received from the frontal detector 20$_4$ and the multi-detector fusion module 32. A side view recognizer 30$_5$ receives and process the outputs received from the side view detector 20$_5$ and the multi-detector fusion module 32. A recognizer fusion module 34 receives and processes the output of the frontal recognizer 30$_4$ and the side view recognizer 30$_5$.

Figure 6:
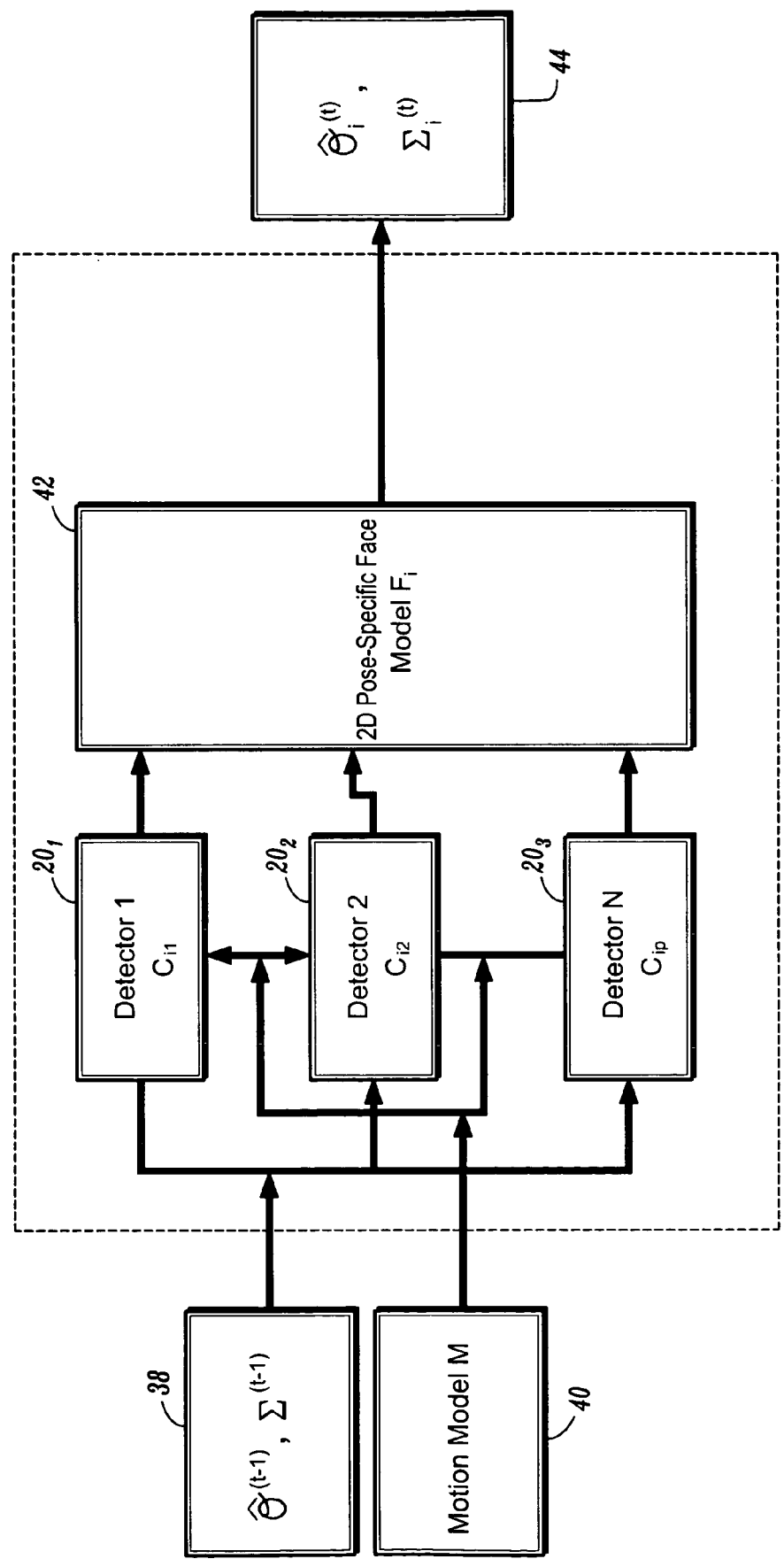
FIG. 6 shows the multi-detector fusion process according to an embodiment of the present invention.

FIG. 6 shows the multi-detector fusion process in an embodiment of the present invention. The face detectors described below achieve invariance to pose through the use of NIR and an active light source. Invariance to pose is achieved by incorporating an array of pose-specific detectors. The output of these detectors is then fused together robustly to achieve pose-independent face detection.

The process of fusing the output of the detectors 20$_1$-20$_3$ (see FIG. 4) by the multi-detector fusion module 32 (see FIG. 4) is described next. A set of pose-specific detectors (or trackers) is denoted by $$D \equiv \{D_i\}_{i=1}^{N},$$

where N=2 in the current example. Each detector D$_i$ receives a pose estimate 38 at previous time instant t−1, $\hat{\theta}^{(t-1)}$ along with the covariance of the estimate $\Sigma^{(t-1)}$. Each of the detectors is also supplied as input a motion model M 40. For the present application, the motion is assumed to have a mean of zero and a variance which dictates the 99% confidence region, around the location of the component in the previous video frame, in which the component detectors need to search in the current video frame. Each of the detectors 20$_1$-20$_3$ gives an estimate of a location of the component at time t, which is $$\left\{\hat{C}_{ij}^{(t)}, \sum_{ij}^{(t)}\right\}.$$

Estimate of the pose at time t, $\theta_i^{(t)}$ is given by the Equation (1) below:

$$\theta_i^{(t)} = \arg\min_{\theta} \sum_{j=1}^{P} \left\|A_\theta \hat{C}_{ij}^{(t)} - C_j\right\|_{\Sigma_{ij}^{(t)}}^{2}$$

where, P is the number of components, which are three in this example, and, $A_\theta$ is the matrix corresponding to an affine transformation model. Note that the elements of the matrix are linear in the unknown parameters θ. Also, $$\{\hat{C}_{ij}^{(t)}, \Sigma_{ij}^{(t)}\}$$

are the estimated location and the associated covariance of the $j^{th}$ component detected by the $i^{th}$ face tracker/detector. The detector-tracker is based on Adaboost strong classifiers, which are in commonly assigned U.S. patent application to Binglong Xie et al., filed on May 11, 2004 (Ser. No. 10/842, 802), the contents of which are incorporated herein by reference. Further, $C_j$ is the 2D location of the jth face component of the normalized, pose-specific face. For notational convenience, the norm of the vector x is denoted with an associated matrix $$\Sigma \text{ as } \|x\|_\Sigma \text{ defined as, } \|x\|_\Sigma \equiv X^T \Sigma^{-1} x. \quad \text{(Equation 2)}$$

Equation 1 states that each pose-specific face detector detects faces that can be represented as some geometric transformation of a normalized face with a predefined canonical pose. The transformation can be a 2D affine transformation. This geometric transformation thus characterizes the specific pose variation of the detected face with respect to the canonical pose of the normalized face. Since each face detector can only detect faces with a subset of poses in the pose space, an array of such detectors need to be realized and fused for a face detector which can detect faces with large pose variations.

Equation 1 can be rewritten as:

$$\hat{\theta}_i^{(t)} = \arg\min_\theta \sum_j \|M_{ij}^{(t)}\theta - b_{ij}^{(t)}\|_{\Sigma_{ij}^{(t)}}^2.$$

The above equation states that each component detector j, for the face detector i, gives some information about the unknown transformation θ. Associated with this information is the uncertainty matrix $$\Sigma_{ij}^{(t)}.$$

The specific form of the equation is obtained by rearranging the term of Equation 1 to write the matrix $A_\theta$ as the vector of unknowns θ. The solution of the above rewritten equation is given by the standard weighted least squares solution, given below.

$$\hat{\theta}_i^{(t)} = \left(\sum_j M_{ij}^{(t)T} \Sigma_{ij}^{(t)-1} M_{ij}^{(t)}\right)^{-1} \cdot \sum_j M_{ij}^{(t)T} \Sigma_{ij}^{(t)-1} b_{ij}^{(t)} \text{ and,}$$

$$\Sigma_i^{(t)} = \left(\sum_j M_{ij}^{(t)T} \Sigma_{ij}^{(t)-1} M_{ij}^{(t)}\right)^{-1}$$

This solution can be interpreted as fusion of information from the individual component detectors under the condition of independence. Each location observation $b_{ij}^{(t)}$ is weighted by the inverse of the uncertainty matrix. The matrix $M_{ij}^{(t)T}$ brings transforms the information from the image location domain to the pose space. The covariance $$\Sigma_i^{(t)}$$

normalizes the effect of correlation among different components of the pose vector θ.

In at least one embodiment, detector fusion is implemented to select the output of the detector with the highest confidence, and then recognize the face image with a recognizer that uses the output of such detector. In another embodiment the multiple detectors are organized as an array to detect various poses of the human face, which are recognized using a pose-specific array of recognizers.

Figure 7:
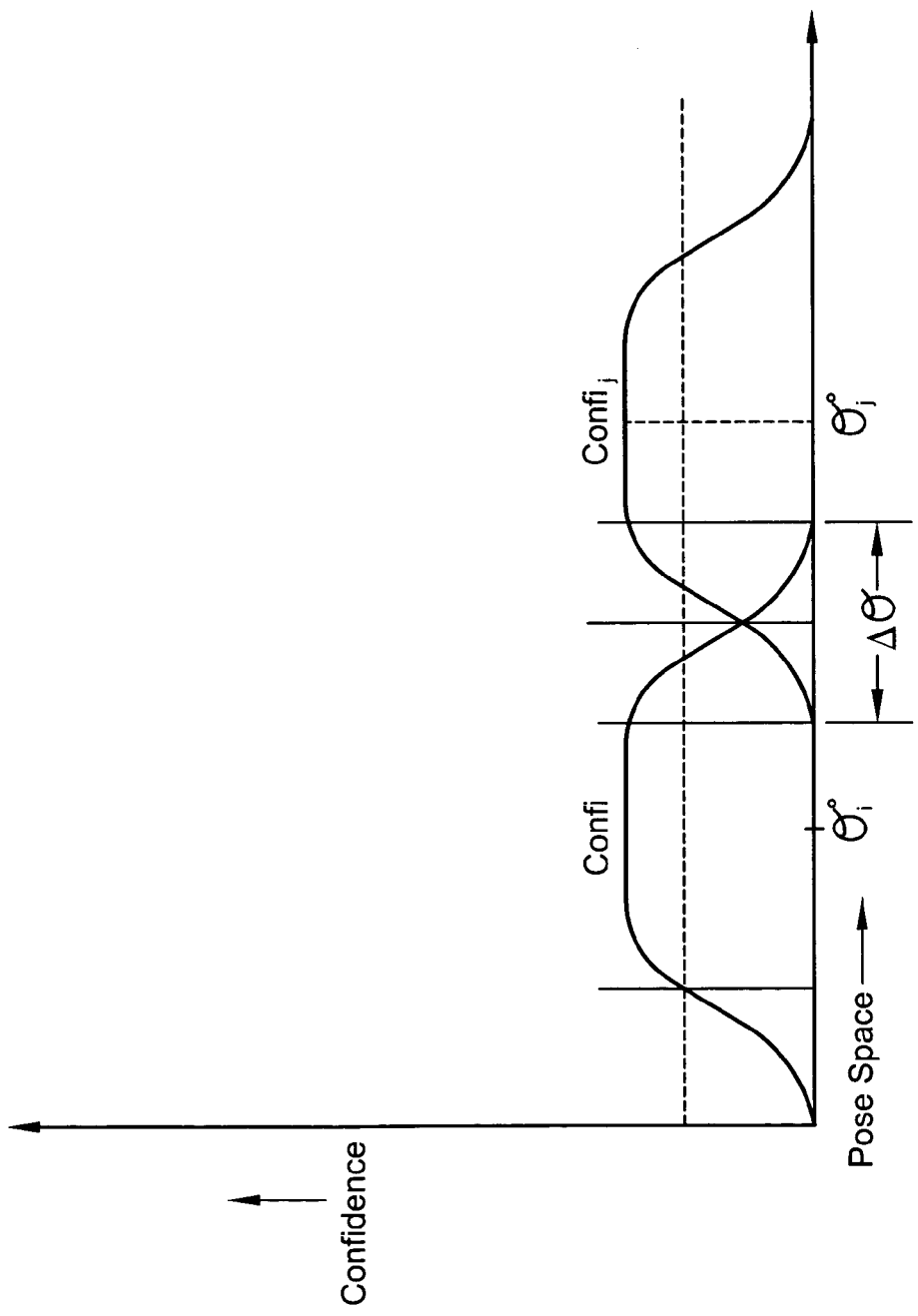
FIG. 7 shows an exemplary performance graph of the pose-specific detectors according to an embodiment of the invention.

FIG. 7 shows an exemplary performance graph of the pose-specific detectors in an embodiment of the invention. The pose specific detectors are empirically seen to have the performance shown in the chart. The X-axis of the graph represents the pose space and the Y-axis represents the confidence measure. The graph shows that apart from a relatively small overlap region, the pose specific detectors have high confidence in disjoint regions. In those regions, i.e., $$\theta \in R_\theta \setminus \Delta\theta \left(\text{where } R_\theta \equiv \bigcup_i U_i R_{\theta_i}\right.$$

is the overall range of detection and $R_{\theta_i}$ is the range of individual detectors), the pose estimates are defined as follows:

$$\hat{\theta}^{(t)} = \theta_{\hat{i}}^{(t)} \text{ where } \hat{i} \equiv \arg\max\{C_i^{(t)}\} \text{ and } C_i^{(t)} = \text{trace}(\sum_{\theta_i}^{(t)-1}).$$

For computation efficiency purposes, the above fusion strategy is used for the whole pose space. It is observed that such an approximation leads to negligible change in performance.

Figure 8:
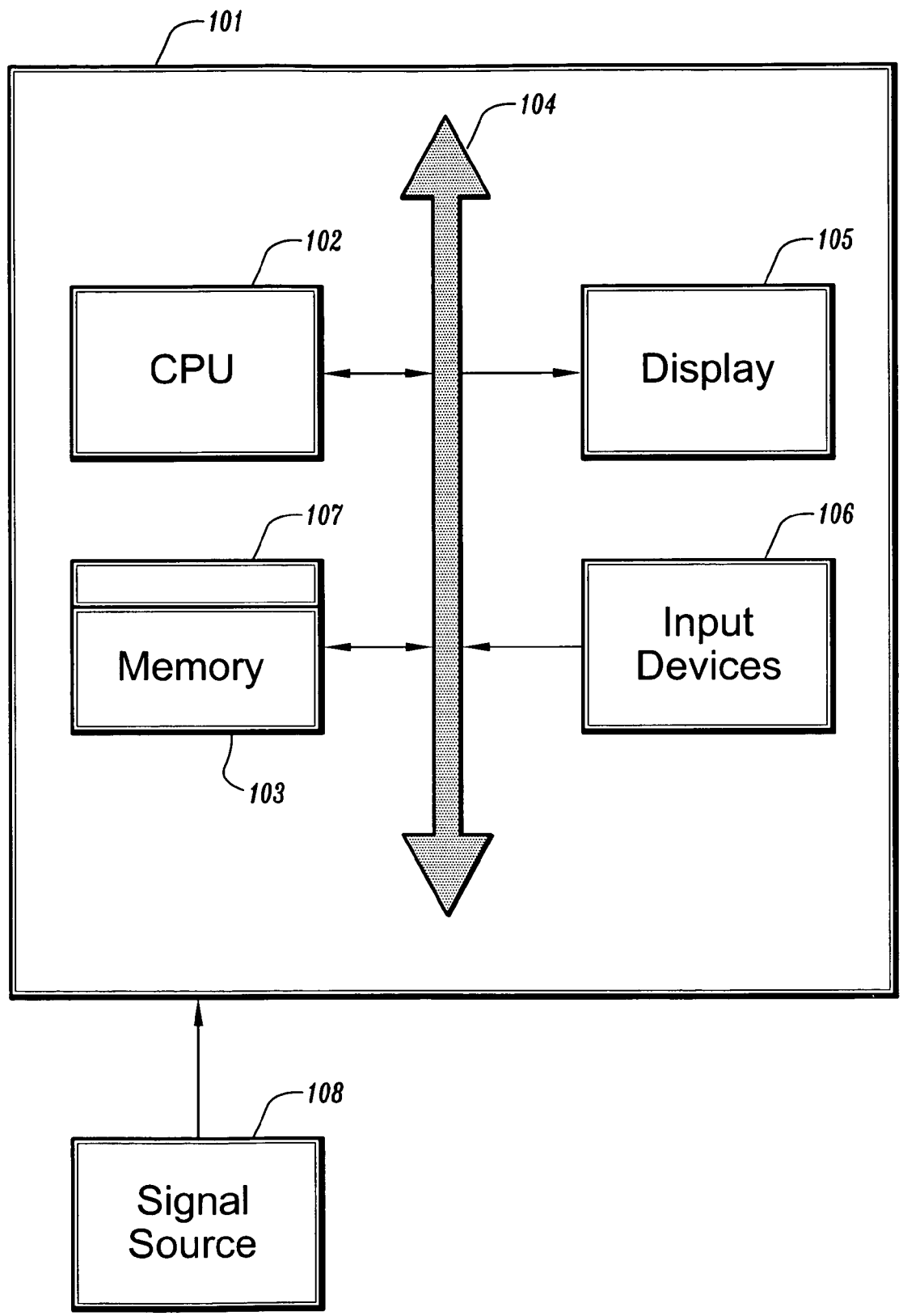
FIG. 8 shows an exemplary computer system used to implement at least one embodiment of the invention.

FIG. 8 shows an exemplary system used to implement at least one embodiment of the invention. Referring to FIG. 8, according to an exemplary embodiment of the present invention, a computer system 101 for implementing the invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. An exemplary embodiment of the invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention in an exemplary embodiment of the invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed in an exemplary embodiment of the invention. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of image processing for detecting and recognizing an image object in an image, the method comprising:
    detecting at least one image object using a plurality of pose-specific object detectors;
    fusing the outputs from the object pose detectors;
    recognizing at least one image object using a plurality of pose-specific object recognizers that use outputs from the pose-specific detectors and the fused output of the pose-specific detectors; and
    fusing the outputs of the pose-specific object recognizers to recognize the image object.

2. The method of claim 1, wherein the image is an infrared image obtained using a camera that can capture an infrared image.

3. The method of claim 1, wherein each one of the pose-specific object detector detects and fuses output of a plurality of component detectors which detect components of a given pose of an image object.

4. The method of claim 3, wherein the image object is a face and the component detector detects at least one of a left-eye component, a right-eye component and a lower-face face component.

5. The method of claim 4, wherein the step of performing fusion of the pose-specific object detector output comprises:
    selecting the output of the pose-specific object detector with a highest confidence measure among the pose-specific object detectors.

6. The method of claim 5, wherein the step of performing fusion of the pose-specific object recognizer outputs comprises:
    recognizing the face image with one of the pose-specific object recognizers that uses the output of the pose-specific object detector with the highest confidence measure.

7. The method of claim 4, wherein the component detectors comprise a front view detector and a side view detector, and the image recognizers comprise a front view recognizer and a side view recognizer.

8. The method of claim 4, wherein the pose-specific object detectors form an array of pose-specific object detectors for detecting faces having a plurality of poses in the input image.

9. The method of claim 8, wherein the pose-specific object recognizers form an array of pose-specific object recognizers for recognizing a plurality of poses of the face.

10. A method for detecting and recognizing a face in an image, the method comprising:
    detecting one or more faces in the image using a plurality of pose-specific detectors, wherein the face poses are sourced from an infrared image of the face;
    fusing the outputs from the pose-specific detectors;
    recognizing the face using a plurality of pose-specific recognizers that use outputs from the pose-specific detectors and the fused output of the pose-specific detectors;
    fusing the outputs of the pose-specific recognizers; and
    recognizing the face from an image database of multiple faces using the fused output of the pose-specific recognizers.

11. The method of claim 10, wherein each one of the pose detector detects and fuses output of a plurality of component detectors that detect components of a given face pose.

12. The method of claim 11, wherein the components of a given face pose comprise a left-eye component, a right-eye component and a lower-face face component.

13. A computer readable program storage device, tangibly embodying a program of instructions executable by a computer to perform method steps comprising:
    detecting at least one image object using a plurality of pose-specific object detectors;
    fusing the outputs from the object pose detectors;
    recognizing at least one image object using a plurality of pose-specific object recognizers that use outputs from the pose-specific detectors and the fused output of the pose-specific detectors; and
    fusing the outputs of the pose-specific object recognizers to recognize the image object.

14. The device of claim 13, wherein the image is an infrared image obtained using a camera that can capture an infrared image.

15. The device of claim 13, wherein each one of the pose-specific object detector detects and fuses output of a plurality of component detectors which detect components of a given pose of an image object.

16. The device of claim 15, wherein the image object is a face and the component detector detects at least one of a left-eye component, a right-eye component and a lower-face face component.

17. The device of claim 16, wherein instructions for the step of performing fusion of the pose-specific object detector output comprise:
    selecting the output of the pose-specific object detector with a highest confidence measure among the pose-specific object detector.

18. The device of claim 17, wherein instructions for the step of performing fusion of the pose-specific object recognizer outputs comprise:
    recognizing the face image with one of the pose-specific object recognizers that uses the output of the pose-specific object detector with the highest confidence measure.

19. The device of claim 16, wherein the component detectors comprise a front view detector and a side view detector, and the image recognizers comprise a front view recognizer and a side view recognizer.

20. The device of claim 16, wherein the pose-specific object detectors form an array of pose-specific object detectors for detecting a plurality of poses of the face.

21. The device of claim 20, wherein the pose-specific object recognizers form an array of pose-specific object recognizers for recognizing a plurality of poses of the face.

* * * * *

UNITED STATES PATENT AND TRADEMARK OFFICE
CERTIFICATE OF CORRECTION

PATENT NO. : 7,542,592 B2  Page 1 of 1
APPLICATION NO. : 11/091142
DATED : June 2, 2009
INVENTOR(S) : Maneesh Singh et al.

It is certified that error appears in the above-identified patent and that said Letters Patent is hereby corrected as shown below:

Title page, item [73]

Under Assignee:

Siemesn Corporate Research, Inc.

Should be corrected to read:

Siemens Corporate Research, Inc.

Signed and Sealed this

Twenty-fifth Day of August, 2009

David J. Kappos
*Director of the United States Patent and Trademark Office*